United States Patent [19]

Myers et al.

[11] Patent Number: 4,629,252
[45] Date of Patent: Dec. 16, 1986

[54] SEAT RECLINER

[75] Inventors: Timothy S. Myers, Warren; William H. Jones, Utica, both of Mich.

[73] Assignee: Ferro Manufacturing Corporation, Southfield, Mich.

[21] Appl. No.: 600,792

[22] Filed: Apr. 12, 1984

[51] Int. Cl.4 .............................. A47C 1/025
[52] U.S. Cl. .................. 297/366; 297/367; 297/379
[58] Field of Search .............. 297/366, 367, 379

[56] References Cited

U.S. PATENT DOCUMENTS

| | | | |
|---|---|---|---|
| 3,747,976 | 7/1973 | Lacey | 297/366 X |
| 3,957,312 | 5/1976 | Bonnaud | 297/366 X |
| 3,973,799 | 8/1976 | Berg | 297/379 X |
| 4,314,729 | 2/1982 | Klueting | 297/366 |
| 4,456,300 | 6/1984 | Kluting et al. | 297/366 |

FOREIGN PATENT DOCUMENTS

| | | | |
|---|---|---|---|
| 20520 | 2/1979 | Japan | 297/366 |
| 149986 | 3/1955 | Sweden | 297/366 |

Primary Examiner—William E. Lyddane
Assistant Examiner—Laurie K. Cranmer
Attorney, Agent, or Firm—Stephenson and Boller

[57] ABSTRACT

The seat back for a bench vehicle seat is mounted for movement with an adjustable sector between an upright or dress-up position and a full reclining position, and may be positively locked in any intermediate position of adjustment. In addition, the seat back is releasably pivoted to the sector, and is automatically released for forward pivotal movement to a horizontal position when the sector is pivoted forwardly to a limiting position.

9 Claims, 10 Drawing Figures

4,629,252

SEAT RECLINER

BACKGROUND OF THE INVENTION

Field of the Invention

The present invention is concerned with adjustable seat backs for bench type automobile seats, normally provided in cars, vans and buses.

In accordance with the present invention, the seat back is movable relative to the seat bottom between a rearwardly extending horizontal full reclining position and a forwardly extending horizon position in which the back of the seat constitutes a horizontal support including an intermediate position in which the seat back is substantially erect herein referred to as the dress-up position.

Means are provided to retain the seat back positively locked in any intermediate position between its erect and its full reclining position. This includes sectors pivoted to a seat frame comprising spaced apart plates referred to as seat mounts and covers, the sectors having arcuate sections of ratchet teeth engageable with locking pawls pivoted between the plates constituting the seat mount and cover. The pawls are engaged by wedge cams connected to interconnected release handles to each end of the seat ratchet which are spring biased in a direction to wedge the pawls into engagement with the ratchet section on the sector.

The wedge angle is such that the locking action is irreversible by forces applied to the seat back. The release handle when moved to full release position by the operator includes a surface engageable with a finger on the pawl to provide for positive displacement of the pawl from the ratchet teeth.

The sectors are provided at both ends of the seat, and are connected to strong counterbalance springs effective to move the seat back to and slightly beyond its full erect or dress-up position. The seat back is adjustable by a seat occupant who releases the cam lock and applies pressure to move the seat back against the counterbalance springs to the desired position, at which time release of the handle permits its spring to move it and the wedge cam to sector locking position.

Since the locking hardware is provided at both ends of the seat and seat back, it is necessary to provide means for releasing the sectors for simultaneous movement. This is accomplished by a torsion tube extending between the ends of the seat back, with connections to the release handles, so that the seat back may be adjusted or manipulated from either end.

The sectors are each provided with hinge plates which are pivotally connected to the upper ends of the sectors, and which are fixedly secured to opposite ends of the seat back frame to provide for forward swinging movement of the seat back from its upward extending position to its forwardly extending position. During movement of the seat back between its erect position and its fully reclining position, the hinge plates are fixedly connected to the sectors by latch cams pivoted to the sectors and latched over studs connected to the hinge plates. The latch cams have camming pins extending into cam slots provided in the seat mounts. The seat mount slots include arcuate portions concentric with the pivot axis of the sectors and camming portions inclined to the arcuate portions operable during limited movement of said sectors forwardly from erect position to cam the latch cams to release the studs on the hinge plates. Thus, as the sectors are spring biased into their forward limiting position, the hinge plates with the seat back secured thereto are released for pivotal movement of the hinge plate relative to the sectors to permit the seat back to move to forwardly extending horizontal position. As the sectors move to release the latch cams, the tooth portions of the sectors move beyond the pawl teeth, which then slide on smooth arcuate surfaces on the sectors.

When the seat back is swung upwardly and rearwardly from its forwardly extending horizontal position, the studs on the hinge plates engage the latch cams, and further movement pivots the sectors, causing the latch cams to be cammed into latching position by the cam slots. When the sectors have pivoted sufficiently to engage the latch cams, the toothed ratchet portions are engaged by the pawls which are wedged in locking position by the spring biased wedge cams.

DESCRIPTION OF THE PREFERRED EMBODIMENT

Figure 1:
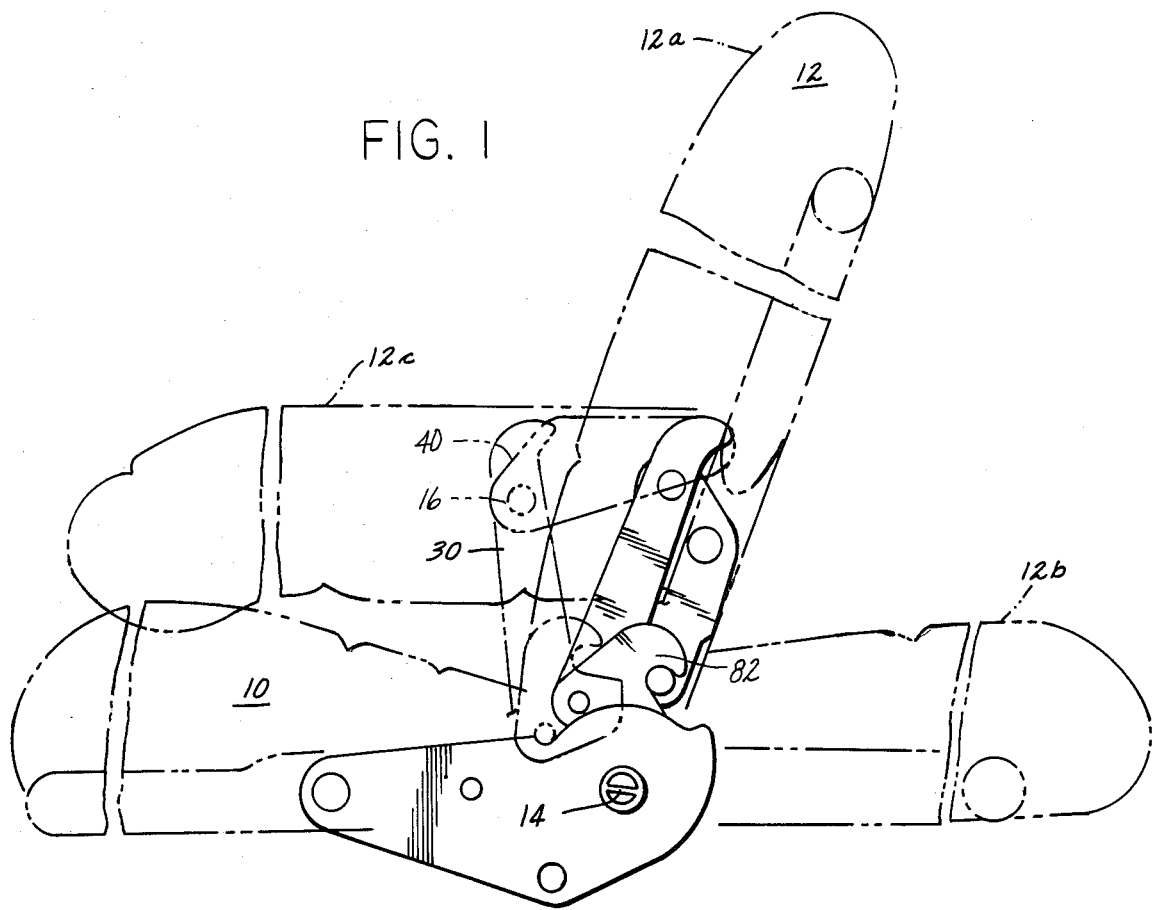
FIG. 1 is a diagrammatic side elevation illustrating the range of adjustment of the seat back.

Referring first to FIG. 1, there is illustrated vehicle seating construction comprising a bench seat bottom 10 which extends transversely of the vehicle and has a width sufficient to support more than one passenger. The construction also comprises a seat back 12 movable with reference to the seat. The seat back 12 shown in a generally erect dress-up position 12a. From this position the seat back is incrementally pivotally adjustable rearwardly about an axis indicated at 14 to a full reclining position indicated at 12b. From the dress-up position 12a, the seat back is mounted for free forward pivotal movement about axis 16 to assume the horizontal position indicated at 12c. In this last position, the rear surface of the seat back constitutes a horizontal support surface. The rear surfaces of a plurality of seat backs of adjacent bench type seats occupy a horizontal plane.

Figure 2:
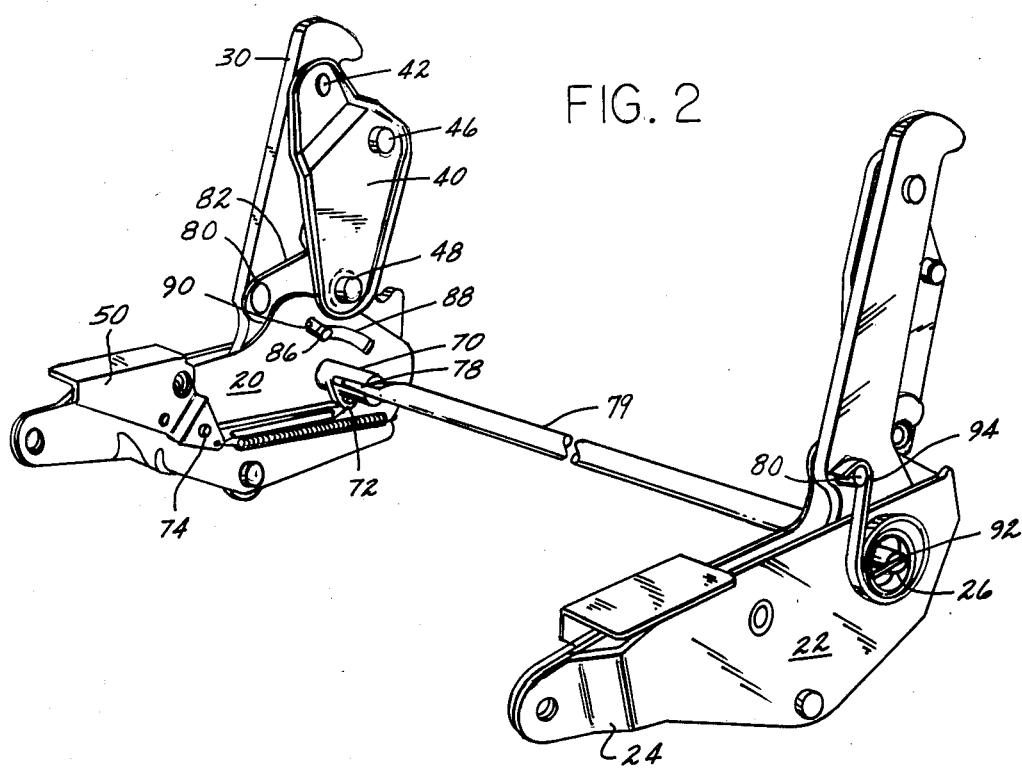
FIG. 2 is a fragmentary perspective of the seat back supporting hardware.

The hardware which provides the above described movements of the seatback, as shown in detail in the remaining figures, is best illustrated in FIG. 2. Since the bench seat 10 has a substantial width transversely of the vehicle it is necessary to support and provide separate mechanisms for adjusting the seat back 12 at both lateral ends of the seat. These mechanisms are essentially identical except that each is a mirror image of the other, and the same reference characters are applied to similar components and parts thereof.

The seat bottom 10 comprises a frame which at its lateral end is connected to seat support structures each comprising seat mounts 20 which as shown are flat plates. At the outer sides of seat mounts 20 are covers 22. Covers 22 are essentially flat plates with offset bends 24 to provide space between seat mounts and covers to enclose and support components of the operating mechanism.

Figure 3:
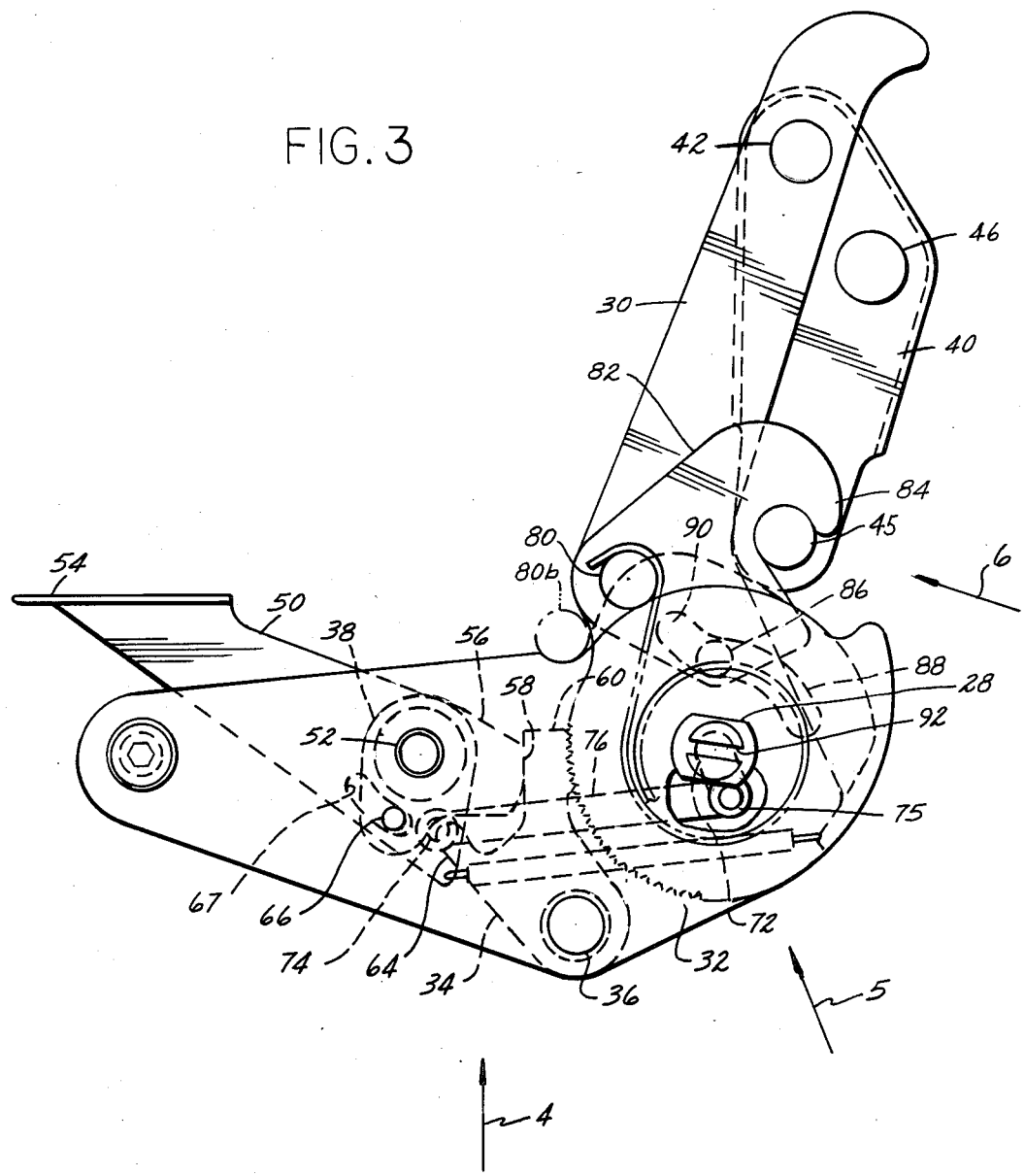
FIG. 3 is a side elevation of the hardware.
Figure 4:
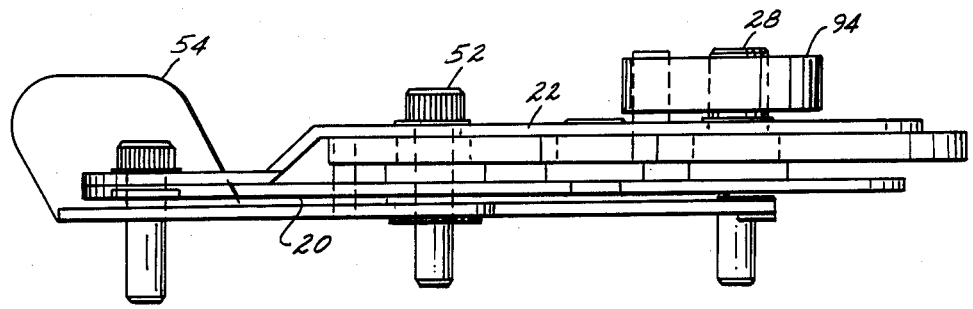
FIG. 4 is a bottom plan view of the structure shown in FIG. 3.

Extending between the seat mounts 20 and covers 22 are pivot post 26 which are non-rotatably fixed thereto by a non-circular or flattened intermediate section indicated at 28 in FIG. 3. Mounted for pivotal movement on posts 26 are elongated sectors 30 provided with arcuate toothed rack portions 32. Toothed pawls 34 are pivoted on pins 36, and may be wedged in positive locking engagement with the rack teeth by wedge cams 38.

Vertically elongated hinge plates 40 are pivoted at their upper ends to sectors 30 by rivet 42, and the hinge plates at opposite ends of the seat back 12 are fixed to the seat back frame by screws 44,45 extending through abutment spacers 46,48 together providing abutments. The seat back 12 together with hinge plates 40 constitute a unitary structure which is pivotal about the axis of rivets 43 to provide for movement of the seat back to the forwardly extending horizontal position.

The mechanism for positively locking the seat back in selected reclining position comprises release handles 50 pivoted by pins 52 and rotatable relative to the seat supports 20,22 at the inner sides thereof. The handles includes bent over flanges 54 which overlie the seat supports.

Between the seat mounts 20 and covers 22, and occupying the vertical plane defined by the sectors 30 and pawls 34 are wedge cams 38 which are pivotal with the handles. Cams 38 have lobes 56 provided with wedge surfaces 58 engaging the rear surfaces of toothed arms 60 of the pawls. The surfaces 58 are formed to have a friction locking angle with the arm, so that forces applied from the seat back to the pawl cannot release the pawl.

Handles 50 have tension spring 62 connecting them to the seat mount and urging the handle counter clockwise (FIG. 3) to bias wedge cams 56 into locking engagement with pawls 34.

Pawls 34 have short release arms 64 engageable by the lobe 56 of cam 38 when the handle 50 is raised. Accordingly, raising either of the handles 50 first releases pawls 34 and then positively rotates the pawls out of engagement with the ratchet section of sectors 30.

Handles 50 are connected to cams 38 by pins 66 which are movable in arcuate slots 67 provided in seats mounts 20 to limit release movement of the handle. Accordingly, movement of either handle 50 is transmitted directly to the wedge cam 38.

Figure 5:
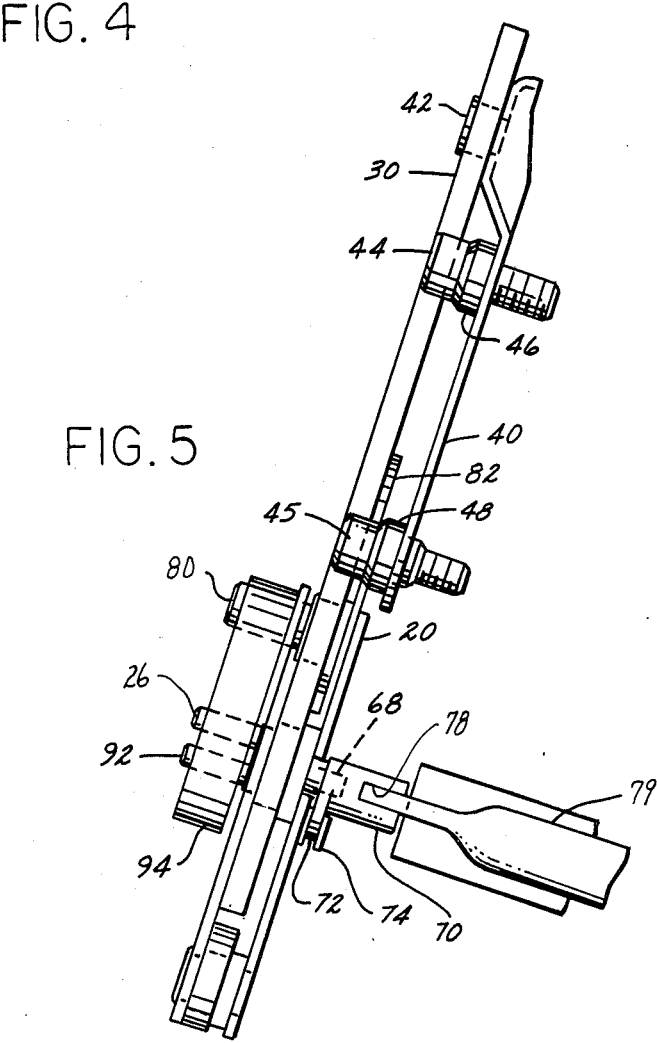
FIG. 5 is an elevation taken in the direction of arrows 5—5 of FIG. 3.
Figure 6:
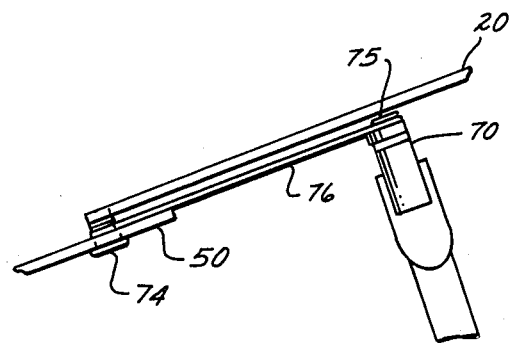
FIG. 6 is an elevation taken in the direction of arrows 6—6 of FIG. 3.

In order to provide simultaneous release of the wedge locking mechanism at opposite ends of the seat, the inner ends of pivot posts 26 terminate in reduced diameter pin portions 68 (FIG. 5) on which couplers 70 are rotatably mounted. Each coupler 70 includes a radially extending arm 72 which is pivotally connected to pin 74 on handle 50 by a rigid link 76 (FIG. 6). Link 76 is pivotally connected to arm 72 by pin 75. Couplers 70 are slotted as indicated at 78 and receive opposite flattened end portions of a torque tube 79. Accordingly, the handles 50 at either end of the seat may be actuated to release both locking pawls simultaneously.

Pivoted to the sectors 30 by sector stop pins 80 are latch cams 82 which at their free ends include hooks 84 which are shaped to engage over abutments provided by screws 45. In addition, latch cams 82 carry camming pins 86 which move in slots in the adjacent seat mounts 20 as the seat back is adjusted between the full reclining position and the erect dress-up position illustrated in FIGS. 3 and 8. The slots are composed of arcuate portions 88 concentric with posts 26, and camming portions 90 inclined radially outwardly from arcuate portions 88. Thus, as the sectors are adjusted between full reclining and dress-up position, hooks 84 lock the hinge plate 40, and hence the seat back to the sectors 30. However, as the seat back moves slightly forward from the dress-up position, the teeth on pawl arms 60 overlie smooth cylindrical surfaces of one end of the array of rack teeth, so that the locking mechanism is disabled. At the same time, pins 86 are cammed upwardly by slot portions 90, and the hooks 84 on the latch cams are disengaged from screws 45. This frees the seat back for free forward swinging movement relative to sectors 30 about the axis of rivets 42.

Pivot pins 80 carried by sectors 30 limits both forward and rearward pivotal movement of the sectors by engaging the relatively stationary seat support structure including cover 22, at positions 80a and 80b as will be described subsequently.

In addition, screws 44 on hinge plates 40 engage the upper ends of sectors 30 to limit forward swinging movement of the hinge plate as will also be described subsequently.

Each of the pivot posts 26 as previously described is fixed against rotation in the seat frame composed of seat mount 20 and cover 22 by flats 28 fitting within a non-circular opening in cover 22. The posts 16 are slotted as seen at 92 and receive one end of coiled counter-balance springs 94, the other end of which engages pins 80, carried by sector 30. The springs 94 exert an upwardly and forwardly acting torque on sectors 30 which is of sufficient magnitude to move sectors 30 and the seat back 12 to the dress-up position which is determined by engagement of pins 80 with seats on the upper edges of cover 22 at the position indicated at 80b. Accordingly, the occupant of the seat may adjust the seat back to any desired reclining position by lifting handle 50 to release pawl 60 and by then leaning back to move the seat back 12 rearwardly, or by reducing rearward pressure on the seat back to allow the springs 94 to move the seat back upwardly and forwardly. Limited additional forward movement of the seat back from the dress-up position disables the pawl and ratchet lock, the springs 94 swing the sectors and seat back through an arc sufficient to cause inclined cam slots 90 to cam the latch cams 82 to release the hooks 84 from screws 45. This releases the seat back for forward pivotal movement about the axes of rivets 42 to the forward horizontal position.

Figure 7:
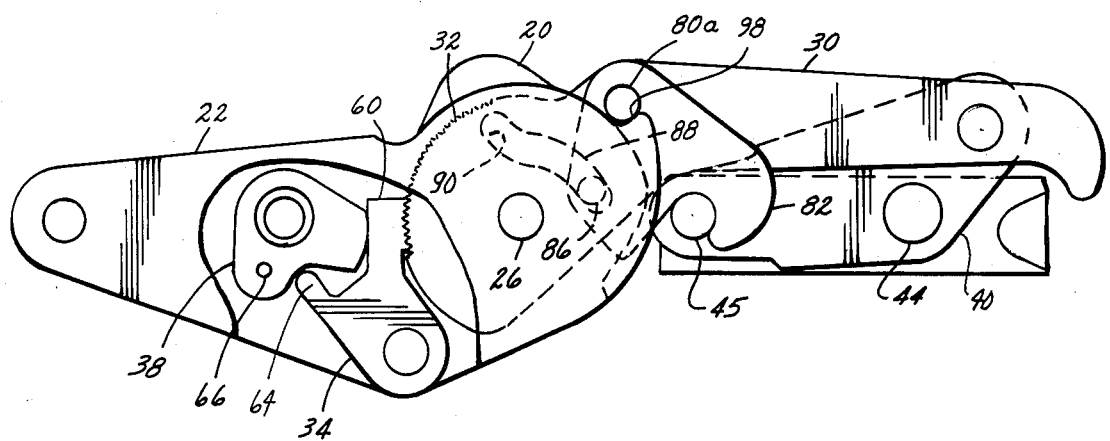
FIGS. 7 through 10 are diagrammatic views illustrating different positions of the hardware in use.
Figure 8:
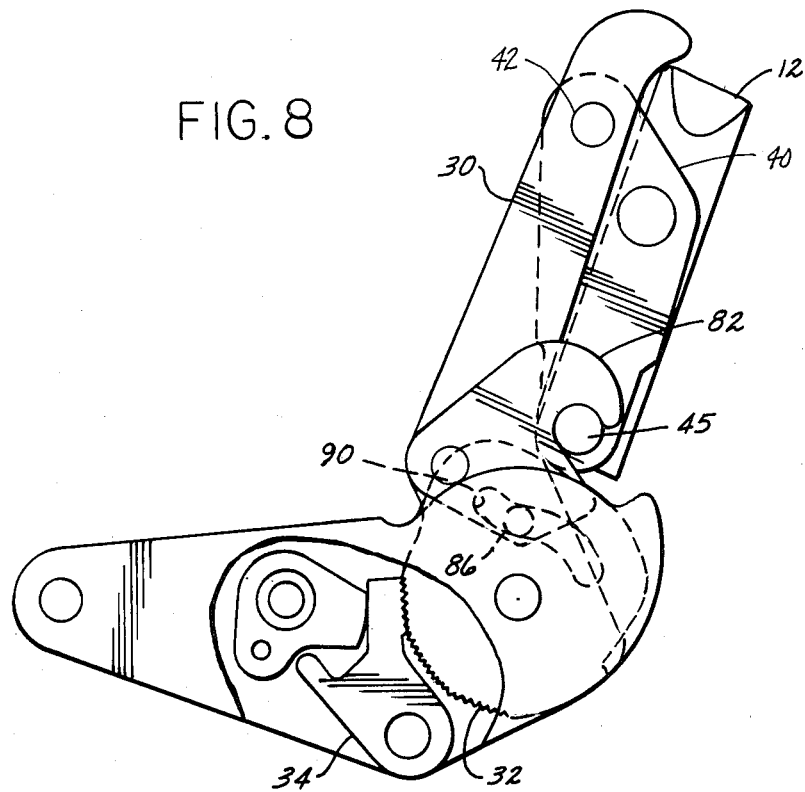
Figure 9:
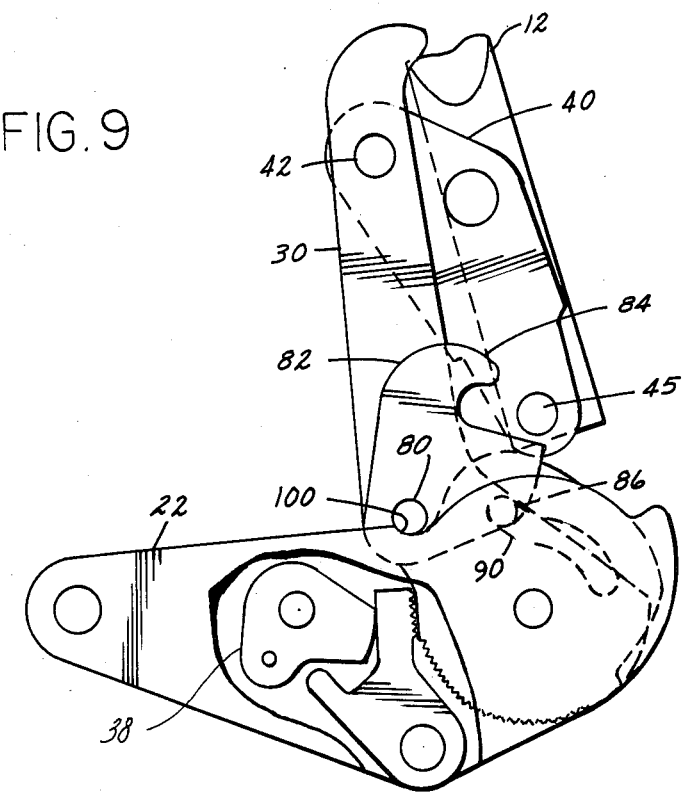
Figure 10:
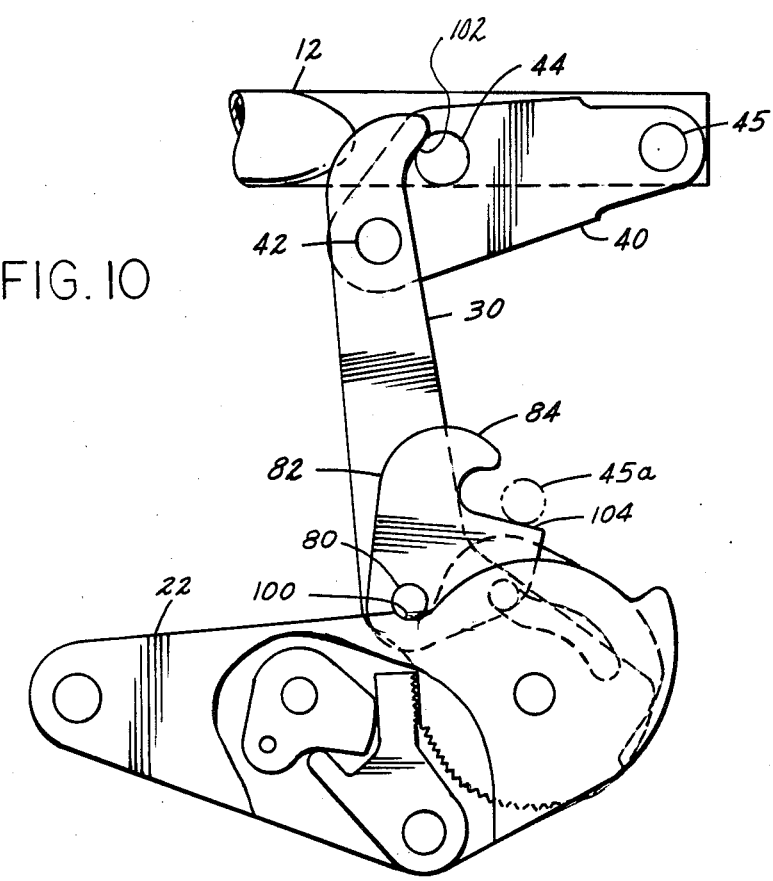

FIGS. 7–10 are simplified elevational views illustrating the positions of components of the hardware as the seat back is moved from the full reclining or rearwardly extending horizontal position of FIG. 7 to the forwardly extending horizontal position of FIG. 10.

As seen in FIG. 7, the sectors 30, with the seat back frame attached thereto, are pivoted about post 26 to rearwardly extending horizontal position relative to the seat frames which are fixed to the seat support structure composed of seat mounts 20 and covers 22. This is a limiting position determined by engagement of sector stop pins 80 at position 80a (FIG. 7) in recesses 98 formed in the top edges of cover plates 22. At this time, guide pins 86 on the latch cams 82 are adjacent the ends of arcuate slots portions 88 in seat mounts 20. The latch cams 82 engage screws 45 on the hinge plates 40.

The seat backs are retained in this position by interlocking engagement of the pawl teeth on arms 60 of pawls 34 and toothed racks 32 on sectors 30. The pawls are locked in position by wedging action of cams 38. The cams are resiliently urged in wedge locking direction by the tension springs 62 connected between the handle 50 and the cover plate 22. Handles 50 are fixed to cams 38 and pins 66 as previously described.

Referring now to FIG. 8, the sector 30, hinge plate 40 and seat back 12 are illustrated in the dress-up position which is reached by upward and forward swinging of the seat back from the full reclining position illustrated in FIG. 7, by the counter balance springs 94 as controlled by an occupant of the seat. At this time, the latch cams 82 reamin in closed position over screws 45 and the pawl teeth of pawl 34 remain interlocked with teeth of ratchet sectors 32 on sectors 30. The guide pins 86 are at the juncture of the arcuate slot section 88, and the inclined section 90. At this time, release of the pawls will permit initial movement by counter balance springs 94 of sectors 30, which will disable the pawl and ratchet locking mechanisms and will initiate movement of latch cams relative to screws 45.

Referring now to FIG. 9, guide pins 86 are shown as at the ends of inclined camming slot portions 90, which has opened latch cams 82 to cause their hook portions 84 to disengage from screws 45, thus freeing hinge plates 40 together with the seat back 12 for swinging movement of the seat back about pivots 42 relative to the sectors. Pins 80 are shown in this figure as engaged in seats 100 formed in the upper edges of cover plates 22, preventing further forward movement of sectors 30.

It will be noted that in this position, the teeth on pawl arms overlie smooth arcuate surfaces on sectors 30, so that the sectors as retained in illustrated position only by counter balance springs 94.

While the tension springs 62 connected to handles 60 bias the wedging surfaces of cams 38 against pawl arm 60, the only effect of this at this time is to insure that when the seat back is restored to the position illustrated in FIG. 8, the pawl and ratchet teeth will re-engage.

Referring now to FIG. 10, the seat back 12 is shown in its forwardly extending horizontal position. Here the sectors 30 remain in the limiting positions determined by engagement of sector stop pins 80 with seats 100 in the covers 22. The hooks 84 of latch cams 82 have released screws 45 and the hinge plates secured to opposite ends of the frame of the seat back 12 have been swung approximately 90° about the pivot axis determined by rivets 42. This causes rear surface of the seat back 12 to extend forwardly in horizontal position. It will be noted that in this position screws 44 on hinge plates 40 engage abutment surfaces 102 at the upper ends of sectors 30.

On reverse upward and rearward movement of the seat back, screws 45 on the hinge plates engage surfaces 104 on the latch cams at position 45a and rotate the sectors 30 and latch cams 82 to the position shown in FIG. 8. At this time the hinge plates are locked to the sectors, and the pawl and ratchet teeth re-engages so that the incremental adjustment of the seat back through its range of reclining positions is permitted.

It will be observed that adjustment of the seat back 12 from substantially vertical position to full reclined rearwardly extending position takes place about a first axis which positions the front surface of the seat back in substantially the same horizontal plane as the upper surface of the seat, so as to provide a continuous support surface on which a passenger can recline. However, the pivotal movement of the seat back forwardly from erect position takes place about a second axis above said first axis located to cause the seat back to overlie the seat and to provide a horizontal support surface substantially above the upper surface of the seat.

From the foregoing it will also be seen that the combination of the counterbalance spring 94, locking structure comprising the pawl and rack mechanism and wedge lock 38, and manual release lever 50 provides a seat construction which permits the seat occupant to control the position of the seat back by using the single manual release lever. The seat occupant may set the seat back at any position between substantially upright and full reclining by releasing the pawl and rack, and leaning back to move the seat back rearwardly to a desired position. Release of the lever reactivates the lock. The counterbalance spring will move the seat back through the range of intermediate positions from full reclining to substantially upright as controlled by pressure applied to the seat back by the occupant, and if permitted to reach the full erect position of FIG. 9, the seat back is automatically released for forward swinging about the axis of pivot 42.

We claim:

1. A bench type vehicle seat assembly comprising a seat, a seat back, connector means connected between said seat and seat back providing for said seat back a first pivotal movement about a first pivot axis relative to said seat between a substantially erect position and a full reclining position in which the front surface of said seat back constitutes a substantially horizontal rearward extension of the upper surface of said seat, said means also providing for said seat back a second pivotal movement about a second pivot axis spaced above said first pivot axis relative to said seat between said substantially erect position and a forwardly extending substantially horizontal position in which said seat back overlies said seat and the rear surface of said seat back constitutes a substantially horizontal support surface spaced above the upper surface of said seat, said connector means comprising functionally identical means at opposite ends of said seat and seat back including positive locking means to lock said seat back in a multiplicity of selected positions intermediate its erect position and its full reclining position, and interconnected manually operated release means at both ends of said seat either of which is effective to release said seat back for incremental adjustment between full reclining and erect positions, and latch means operable throughout pivotal adjustment of said seat back between its full reclining and its substantially erect position to limit pivotal movement of said seat back to movement about said first axis, and coacting means on said seat back and said seat responsive solely to limited forward pivotal movement of said seat back from its erect position to release said latch means to provide for further pivotal movement of said seat back forwardly from its erect position to limit such further pivotal movement about said second axis.

2. An assembly as defined in claim 1, in which the connector means at each end of said seat assembly comprises a seat support, an elongated arm pivoted at its lower end to said seat support for movement about a first axis, abutment means limiting forward movement of said arm to a substantially erect position, an elongated hinge plate pivoted at its upper end to said arm and adapted to be fixedly secured to the ends of said seat back, the axis of the pivot connection between said arm and plate being substantially above the pivot connection between said arm and said seat support for movement about a second axis above said first axis, a latch member extending between said arm and said hinge plate and having a disengageable connection with one of said arm and plate and a pivotal connection with the other thereof, and means operable solely as a result of pivotal movement of said arm into its forward limited position to engage and move said latch member to release said hinge plate and the seat back connected thereto for forward pivotal movement about said second pivot axis.

3. An assembly as defined in claim 2, comprising counter balance spring means effective to move said seat back and arm from full reclining position to release said latch and to then retain said arm in the position determined by said abutment means.

4. An assembly as defined in claim 2, in which said arm constitutes a sector having an arcuate section of rack teeth arranged concentric with the axis of the pivot connection between said support and said arm, a pawl pivoted to said support and having locking teeth cooperating with said rack teeth, a locking cam pivotally mounted on said support and wedgingly engageable with said cam, a handle operatively connected to said locking cam, and a resilient means connected between said handle and cam and said support to urge said cam into wedging engagement with said pawl.

5. Connector structure for pivotally connecting the lower edge of a seat back to the rear edge of a seat comprising a seat support including a seat mount plate and a cover plate, a post fixed to said seat support to extend transversely therefrom, an elongated arm pivoted to said support for incremental adjustment about a first axis between an erect position in which said arm extends upwardly from its pivot and a reclining position in which said arm extends substantially horizontally rearwardly, an elongated hinge plate pivoted at one end thereof to said arm for movement about a second axis above said first axis, means for fixing said hinge plate to said arm comprising a latch cam pivotally connected to one of said arm and plate and releasable latch means connecting said latch cam to the other of said arm and plate, coacting means on said arm and said hinge plate responsive to forward movement of said arm to a limiting substantially vertical position to release said latch means to provide for pivotal movement of said hinge plate and the seat back connected thereto relative to said arm about said second axis to position said seat back over said seat with the rear surface of said seat back providing a substantially horizontal support surface.

6. Connector structure for pivotally connecting the lower edge of a seat back to the rear edge of a seat comprising a seat support including a seat mount plate and a cover plate, a post fixed to said seat support to extend transversely therefrom, an elongated arm pivoted to said support for incremental adjustment about a first axis between an erect position in which said arm extends upwardly from its pivot and a reclining position in which said arm extends substantially horizontally rearwardly, an elongated hinge plate pivoted at one end thereof to said arm for movement about a second axis above said first axis, means for fixing said hinge plate to said arm comprising a latch cam pivotally connected to one of said arm and plate and releasable latch means connecting said latch cam to the other of said arm and plate, release means responsive to forward movement of said arm to a limiting substantially vertical position to release said latch means to provide for pivotal movement of said hinge plate and the seat back connected thereto relative to said arm about said second axis to position said seat back over said seat with the rear surface of said seat back providing a substantially horizontal support surface, said hinge plate having an abutment spaced substantially from the pivot connection between said arm and hinge plate, said latch cam being pivoted to said arm and having a hook engageable with said abutment to latch said hinge plate rigidly to said arm, said latch cam having a pin and said seat support having a camming slot interconnection in which said slot comprises an arcuate portion centered on said first axis positioned to retain said latch cam engaged with said abutment as said arm, hinge plate and the seat back connected thereto moves between full reclining and substantially erect position about said first axis and an inclined camming portion positioned to swing said cam latch to abutment releasing position as said arm completes its movement to substantially erect forward limited position.

7. Connector structure for pivotally connecting the lower edge of a seat back to the rear edge of a seat comprising a seat support including a seat mount plate and a cover plate, a post fixed to said seat support to extend transversely therefrom, an elongated arm pivoted to said support for incremental adjustment about a first axis between an erect position in which said arm extends upwardly from its pivot and a reclining position in which said arm extends substantially horizontally rearwardly, an elongated hinge plate pivoted at one end thereof to said arm for movement about a second axis above said first axis, means for fixing said hinge plate to said arm comprising a latch cam pivotally connected to one of said arm and plate and releasable latch means connecting said latch cam to the other of said arm and plate, release means responsive to forward movement of said arm to a limiting substantially vertical position to release said latch means to provide for pivotal movement of said hinge plate and the seat back connected thereto relative to said arm about said second axis to position said seat back over said seat with the rear surface of said seat back providing a substantially horizontal support surface, said hinge plate having an abutment spaced substantially from the pivot connection between said arm and hinge plate, said latch cam being pivoted to said arm and having a hook engageable with said abutment to latch said hinge plate rigidly to said arm, said latch cam having a pin and said seat support having a camming slot interconnection in which said slot comprises an arcuate portion centered on said first axis positioned to retain said latch cam engaged with said abutment as said arm, said hinge plate and the seat back connected thereto move between full reclining and substantially erect position about said first axis, and an inclined camming portion positioned to swing said cam latch to abutment releasing position as said arm completes its movement to substantially erect forward limited position, in which said arm has a arcuate section of locking rack teeth concentric with said first axis, a pawl pivoted between said plates, and having teeth cooperating with said rack teeth, a wedge cam pivoted between said plates and having a wedging and locking surface engaged with said pawl and urging said pawl toward said rack teeth, a handle pivoted to said seat support and operatively connected to said wedge cam, and resilient means connected between said cam and handle and said support to urge said pawl toward said section of rack teeth.

8. A bench type vehicle seat assembly comprising a seat, a seat back, connector means connected between said seat and seat back providing for said seat back a first pivotal movement about a first pivot axis relative to said seat between a substantially erect position and a full reclining position in which the front surface of said seat back constitutes a substantially horizontal rearward extension of the upper surface of said seat, said means also providing for said seat back a second pivotal movement about a second pivot axis spaced above said first pivot axis relative to said seat between said substantially erect position and a forwardly extending substantially horizontal position in which said seat back overlies said seat and the rear surface of said seat back constitutes a substantially horizontal support surface spaced above the upper surface of said seat, the connector means comprising a seat support, an elongated arm pivoted at its lower end to said seat support for movement about said first axis, abutment means limiting forward movement of said arm to a substantially erect position, an elongated hinge plate pivoted at one end to said arm to define said second axis and adapted to be fixedly secured to said seat back, a latch member pivotally mounted on said arm for movement into and out of latching engagement with said hinge plate, and means operable solely as a result of pivotal movement of said arm into its forward limited position to engage and move said latch member out of latching engagement with said hinge plate to release said hinge plate and the seat back connected thereto for forward pivotal movement about said second pivot axis.

9. An assembly as defined in claim 8, comprising counterbalance spring means effective to move said seat back and arm from full reclining position to release said latch member and to then retain said arm in the position determined by said abutment means.

* * * * *